Figure 2:
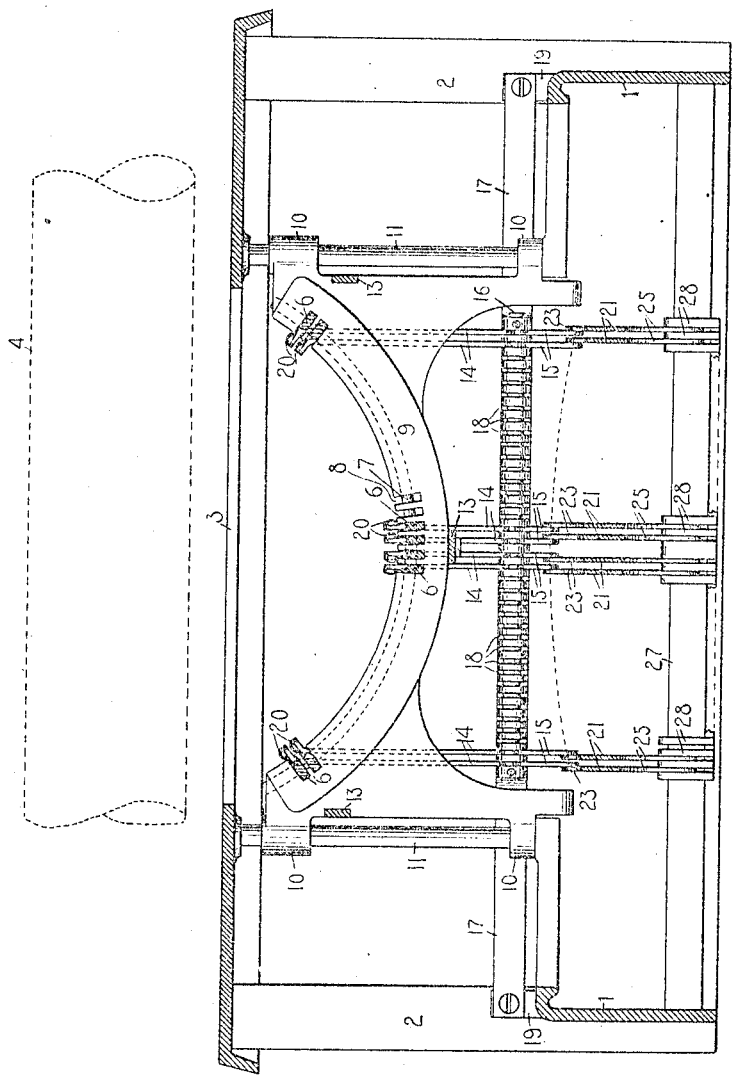

No. 871,374.  
PATENTED NOV. 19, 1907.  
B. C. STICKNEY.  
TYPE WRITING MACHINE.  
APPLICATION FILED APR. 6, 1903.

4 SHEETS—SHEET 1.

Fig. I.

WITNESSES:  
K. V. Donovan  
E. M. Wells

INVENTOR:  
Burnham C. Stickney  
by Jacob Felbel  
HIS ATTORNEY

No. 871,374. PATENTED NOV. 19, 1907.
B. C. STICKNEY.
TYPE WRITING MACHINE.
APPLICATION FILED APR. 6, 1903.

4 SHEETS—SHEET 2.

WITNESSES:
K. V. Donovan,
E. M. Wells

INVENTOR:
Burnham C. Stickney
by Jacob Felbel
HIS ATTORNEY.

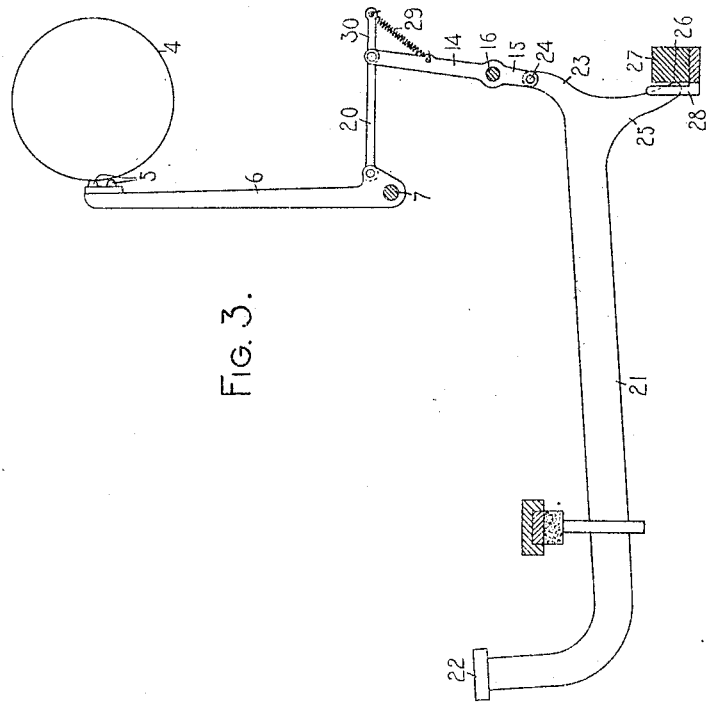

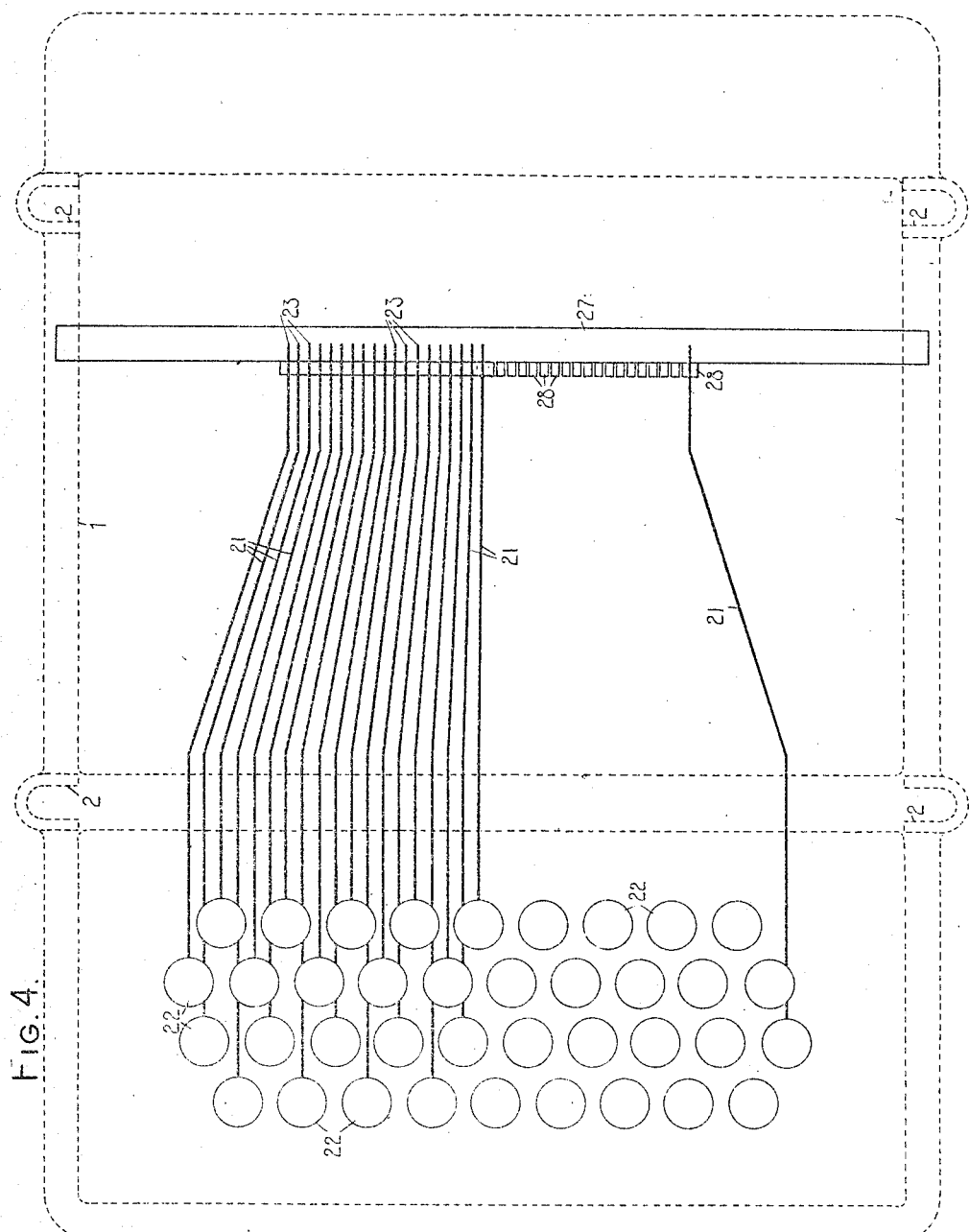

UNITED STATES PATENT OFFICE.

BURNHAM C. STICKNEY, OF ELIZABETH, NEW JERSEY, ASSIGNOR TO UNION TYPEWRITER COMPANY, OF JERSEY CITY, NEW JERSEY, A CORPORATION OF NEW JERSEY.

TYPE-WRITING MACHINE.

No. 871,374. Specification of Letters Patent. Patented Nov. 19, 1907.

Application filed April 6, 1903. Serial No. 161,334.

*To all whom it may concern:*

Be it known that I, BURNHAM C. STICKNEY, a citizen of the United States, and resident of Elizabeth, in the county of Union and State of New Jersey, have invented certain new and useful Improvements in Type-Writing Machines, of which the following is a specification.

This invention relates to typewriting machines, and especially to those of the front strike variety, and its object is to simplify, cheapen and otherwise improve the type-actions.

My invention consists in certain features of construction and combinations of devices, which will be hereinafter fully described and particularly pointed out in the concluding claims.

In the drawings forming part of this specification, Figure 1 is a central longitudinal vertical section of a front strike writing machine made in accordance with my improvements, the parts being shown in normal position. Fig. 2 is a cross-section of the machine taken at about the line $x$—$x$ of Fig. 1. Fig. 3 is a view of a type-action when in working position, that is, at the time the type impression is made on the paper. Fig. 4 is a diagram illustrating the convergence of the rear portions of the key-levers.

In the several views, like signs denote like parts.

The framing of the machine may comprise a base 1, corner-posts 2 and a top-plate 3, over which run the usual carriage and platen 4. Types 5 are mounted on radial type-bars 6, which are pivoted upon a curved rod 7 and strike rearwardly against the platen. The type-bar hubs may work in radial slots 8 cut in a segment 9, in which the fulcrum rod 7 is mounted; said segment being preferably guided by ears 10 upon a pair of fixed vertical guide rods 11, whereby the segment may be shifted vertically. The type-bars at their forward ends may rest upon a segmental pad 12, carried upon the forward ends of rods 13 secured upon the type-bar segment 9.

In rear of the type-bars is mounted a system of upstanding levers of the first order, consisting of upwardly extending arms 14 and downwardly extending arms 15, the latter being preferably shorter than the former. These levers are mounted upon a straight transverse fulcrum rod 16, which is supported upon a bar 17, the latter having vertical slots 18 for the levers, and being fixed upon lugs 19 at opposite sides of the machine base. At their upper ends these levers are connected by forwardly extending links 20 to the type-bars.

Substantially horizontal levers 21 extend forwardly beneath the type-bars, said levers bearing at their forward ends keys 22. At its rear end each lever is ramified, so that it forms a T, the upper cross-arm 23 of the lever being pivoted at 24 directly to the lower arm 15 of its associated up-standing sub-lever. The lower angular arms 25 of the levers which preferably are materially longer than the arms 23, bear rearwardly at their tips at 26 against a transverse fulcrum-bar 27 secured at its ends to the side walls of the base under said upstanding sub-levers. Guides for said arms 25, preferably in the form of a comb 28, are secured to said bar.

It will be seen that the finger key 22, the load point 24 and the fulcrum 26 of each key lever are located respectively at the apices of a triangle, the sides of which form substantial angles with each other, so that an actuation of a key lever will produce a movement of the connection 24 to the type bar that is fore and aft of the machine.

The rear end of the lever is wholly supported by the pendent arm 25 of the up-standing sub-lever, whereby downward movement of this end of the key-lever is prevented. Hence at the depression of a key 22, there is produced a tendency upon the part of the entire key-lever to vibrate downwardly and rearwardly about the pivotal point 24. Hence the arm 25 is caused to press rearwardly against the bar 27; and since the latter is unyielding, it serves as a fulcrum for the entire lever, so that the key is permitted to move down while the pivotal point 24 is drawn forwardly, vibrating the up-standing lever, as seen at Fig. 3. By the rearward movement of the upper arm 14 of the up-standing lever, the link 20 is drawn rearwardly, and the type-bar is swung up to print.

Upon release of the key from pressure, the parts may be returned by the action of any suitable returning spring, that herein illustrated being in the form of a diagonal drawspring 29, caught at one end in a prolongation 30 of the link 20 past its point of connection with the lever arm 14. The spring is caught at the other end in said arm 14. During the printing movement of the type-action, said spring is expanded; and its contraction serves to return the parts to normal position.

Referring to Fig. 2, it will be seen that the type-bars lie in an arc, and that the horizontal links 20 are correspondingly disposed at progressively increasing heights at the sides of the machine. I accordingly make the upper arms 14 of the up-standing levers shortest in the middle of the system, and make them progressively longer from the middle to the sides of the system. The short arms 15 of said levers I increase in length in like manner; while the forwardly extending cross-arms 23 of the key-levers I make longer in the middle and progressively shorter towards the sides of the system, so as to match the increasing length of the arms 15 to which they are pivoted. The parts may all be proportioned so that a substantially uniform leverage upon the type-bars is preserved for all of the keys, so as to give the latter substantially uniform dips. It will also be observed that the system of links is of substantially the same width as the system of type-bars, and that the system of up-standing levers is of substantially the width of the link system. The sub-levers may be parallel, and may stand vertically at Fig. 2, and the system of key-levers (which at the keyboard is wider than the system of sub-levers) may narrow or converge at its rear end, as illustrated at Fig. 4, to equal the width of the system of sub-levers.

Variations may be resorted to within the scope of my invention, and portions of my improvements may be used without others.

What I claim as new and desire to secure by Letters Patent, is:—

1. In a front strike writing machine, the combination of a series of rearwardly striking type-bars, a series of up-standing levers connected thereto, a series of key-bearing forwardly extending levers pivoted at their rear ends to said up-standing levers, angular arms on the rear ends of said key-levers, and bearings for the ends of said arms, the arms being disconnected from but adapted to press against said bearings.

2. In a front strike writing machine, the combination of a series of rearwardly striking type-bars, a series of key-bearing levers extending forwardly beneath the type-bars and each having ramified arms at its rear end, connections between one set of arms and the type-bars and by means of which the key levers receive their support at their rear ends, and bearings for the other set of arms.

3. In a front strike writing machine, the combination of a series of rearwardly striking type-bars, a series of up-standing levers in rear of the type-bars, a series of levers each having ramified arms at its rear end, one set of arms being pivoted directly upon the ends of said up-standing levers, the other set of arms being free, and bearings for the free set of arms.

4. In a front strike writing machine, the combination of a series of rearwardly striking type-bars, a series of up-standing levers of the first order mounted in rear of said type-bars, links connecting said levers to said type-bars, key-bearing levers extending forwardly beneath the type-bars and having at their rear ends upwardly extending arms which are pivoted directly to the lower arms of said up-standing levers, downwardly extending arms upon said key-levers, and a transverse fulcrum bar for said downwardly extending arms.

5. In a front strike writing machine, the combination of a series of rearwardly striking type-bars, a series of up-standing levers in rear of said type-bars, each of said levers being fulcrumed between its ends, links connecting said levers and said type-bars, and forwardly extending key-levers connected to the lower arms of said up-standing levers, the movement of the points of connection between the key levers and the lower arms of the upstanding levers being fore and aft of the machine.

6. In a front strike writing machine, the combination of a series of rearwardly striking type-bars, a series of up-standing levers in rear of said type-bars, each of said levers being fulcrumed between its ends, links connecting said levers and said type-bars, forwardly extending T-shaped key-levers pivoted at one set of their cross-arms to the pendent arms of said up-standing levers, a transverse bar forming a fulcrum for the other set of cross-arms, and guides for the latter set of cross-arms.

7. In a front strike writing machine, the combination of a series of rearwardly striking type-bars, a series of T-shaped key-levers, fulcrums from which the key levers are disconnected but against which one set of cross-arms on said levers bear, and connections between the other set of cross-arms and said type-bars.

8. In a front strike writing machine, the combination of a series of rearwardly striking type-bars, a series of T-shaped key-levers, fulcrums from which the key levers are disconnected but against which one set of cross-arms on said levers bear, and connections between the other set of cross-arms and said type-bars; said connections including a set of sub-levers which are connected to the key levers and support the rear ends thereof.

9. In a front strike writing machine, the combination of a series of rearwardly striking type-bars, a series of T-shaped key-levers, fulcrums for one set of cross-arms on said levers, and connections between the other set of cross-arms and said type-bars; said connections including both a set of sub-levers of the first order to the lower arms of which the key levers are connected, and a set of links connecting said sub-levers directly to the type-bars.

10. In a front strike writing machine, the combination of a series of rearwardly striking type-bars, a series of up-standing levers of the first order mounted in rear of said type-bars, links connecting said levers to said type-bars, key-bearing levers extending forwardly beneath the type-bars and having at their rear ends upwardly extending arms which are pivoted directly to the lower arms of said up-standing levers, downwardly extending arms upon said key-levers, and a transverse fulcrum bar for said downwardly extending arms; said system of up-standing levers being less in width than said system of key-levers at the keyboard, and said key-levers converging at their rear portions.

11. In a front strike writing machine, the combination of a series of rearwardly striking type-bars, a series of up-standing levers of the first order mounted in rear of said type-bars, links connecting said levers to said type-bars, key-bearing levers extending forwardly beneath the type-bars and having at their rear ends upwardly extending arms which are pivoted directly to the lower arms of said up-standing levers, downwardly extending arms upon said key-levers, and a transverse fulcrum bar for said downwardly extending arms; said up-standing levers being pivoted upon a single transverse fulcrum rod, their upwardly extending arms being shortest at the middle of the system and of progressively increasing length from the middle to the sides of the system, and their downwardly extending arms being of correspondingly increasing lengths.

12. In a front strike writing machine, the combination of a series of rearwardly striking type-bars, a series of up-standing levers of the first order mounted in rear of said type-bars, links connecting said levers to said type-bars, key-bearing levers extending forwardly beneath the type-bars and having at their rear ends upwardly extending arms which are pivoted directly to the lower arms of said up-standing levers, downwardly extending arms upon said key-levers, and a transverse fulcrum bar for said downwardly extending arms; said up-standing levers being pivoted upon a single fulcrum rod, their upwardly extending arms being shortest at the middle of the system and of progressively increasing lengths from the middle to the sides of the system, their downwardly extending arms being of correspondingly increasing lengths, and the upwardly extending cross-arms on the key-levers being longest at the middle of the system and of progressively decreasing lengths from the middle to the sides of the system.

13. In a typewriting machine, the combination with a series of rearwardly striking type-bars, of a series of up-standing levers of the first order connected to said type-bars; said levers being fulcrumed in a transverse horizontal line, their upwardly extending arms being shortest in the middle of the system and of progressively increasing lengths from the middle to the sides of the system, their downwardly extending arms being of correspondingly increasing lengths but shorter than the upwardly extending arms; and a system of key-bearing levers connected to said up-standing levers.

14. In a front strike writing machine, the combination of a series of rearwardly striking type-bars, a series of up-standing levers of the first order mounted in rear of said type-bars, links connecting said levers to said type-bars, key-bearing levers extending forwardly beneath the type-bars and having at their rear ends upwardly extending arms which are pivoted directly to the lower arms of said up-standing levers, downwardly extending arms upon said key-levers, a transverse fulcrum bar for said downwardly extending arms; and a system of returning springs connected to said up-standing levers.

15. In a front strike writing machine, the combination of a series of rearwardly striking type-bars, a series of up-standing levers of the first order mounted in rear of said type-bars, links connecting said levers to said type-bars, key-bearing levers extending forwardly beneath the type-bars and having at their rear ends upwardly extending arms which are pivoted directly to the lower arms of said up-standing levers, downwardly extending arms upon said key-levers beneath said upwardly extending arms, a transverse fulcrum bar for said downwardly extending arms, said links being prolonged beyond the points of connections to said up-standing levers, and springs extending diagonally from the rear ends of said links to the upper arms of said up-standing levers, for returning the type-actions to normal position.

16. In a typewriting machine, the combination of a system of type-bars, a system of keys, and connections between said keys and said type-bars; said connections including a system of links and a system of levers to which said links are pivoted; said links being prolonged beyond their points of connections with said levers, and springs extending from said link prolongations to said levers, for returning the type-actions to normal position.

17. In a typewriting machine, the combination of a series of types, a series of type-operating arms, a series of T-shaped levers pivoted at one set of their cross-arms to and supported at their rear ends by said type-operating arms, bearings for the other set of cross-arms, and a series of keys.

18. In a typewriting machine, the combination of a series of type-bars, a series of key-bearing T-shaped levers, a series of sub-levers of the first order to which said key-levers are pivoted at one set of their cross-arms, bearings for the other set of cross-arms, and a series of returning springs.

19. In a typewriting machine, the combination of a series of type-bars, a series of key-bearing T-shaped levers, a series of sub-levers of the first order to which said key-levers are pivoted at one set of their cross-arms, bearings for the other set of cross-arms, and a series of returning springs, said bearing arms being materially longer than said pivoted arms.

20. In a front strike typewriting machine, the combination of rearwardly striking type bars, operating links therefor, upstanding levers of the first order, and key levers; the links being connected to the upwardly projecting arms of the upstanding levers, and the key levers being pivoted directly to and supported by the downwardly projecting arms of the upstanding levers.

21. In a front strike typewriting machine, the combination of rearwardly striking type bars, upstanding levers of the first order connected to said type bars, key levers pivoted directly to and supported by the downwardly projecting arms of said upstanding key levers, and fulcrums for said key levers arranged under said upstanding levers.

22. In a front-strike typewriting machine, the combination of a series of upwardly and rearwardly striking type bars, a series of upright sub-levers of the first order operatively connected to said type bars, key levers directly connected to and supported by said sub-levers, and a fulcrum against which the key lever exerts a rearward pressure.

23. In a typewriting machine, the combination of a series of type bars, a series of key levers each having an upwardly extending arm and a downwardly projecting arm, a fulcrum for the downwardly projecting arm, a sub-lever directly connected to said upwardly extending arm, and by means of which the key lever is supported, and connections between said sub-lever and the type bar.

24. In a typewriting machine, the combination of a type bar, a sub-lever connected with said type bar, a key lever having three arms, one arm bearing a key, one arm coöperating with a fulcrum on which the key lever turns and the third arm being directly connected to said sub-lever and by means of which the key lever is supported.

Signed at the borough of Manhattan, city of New York, in the county of New York, and State of New York, this 28th day of March A. D. 1903.

BURNHAM C. STICKNEY.

Witnesses:
K. V. DONOVAN,
E. M. WELLS.